March 22, 1966  A. GOLDIE  3,241,458
LEVELLING CONTROL SYSTEM
Filed Nov. 12, 1963  3 Sheets-Sheet 1

Inventor
Alexander Goldie
By Cushman, Darby & Cushman
Attorneys

March 22, 1966

A. GOLDIE 3,241,458

LEVELLING CONTROL SYSTEM

Filed Nov. 12, 1963

INVENTOR
ALEXANDER GOLDIE

By Cushman, Darby & Cushman
ATTORNEYS

[# United States Patent Office

3,241,458
Patented Mar. 22, 1966

3,241,458
LEVELLING CONTROL SYSTEM
Alexander Goldie, Handsworth, Birmingham, England, assignor to Incandescent Limited, Smethwick, England, a corporation of the United Kingdom
Filed Nov. 12, 1963, Ser. No. 322,933
Claims priority, application Great Britain, Nov. 14, 1962, 43,093/62
12 Claims. (Cl. 91—171)

This invention relates to an electrical control system for apparatus comprising a beam or like member (hereinafter referred to for convenience as a beam), which can be moved vertically (and may or may not be movable horizontally as well) by hydraulic means and must be kept level (or at a constant inclination) especially while being raised. More particularly, the control system of this invention is applicable to an apparatus as above described, in which opposite ends of the beam are raised by separate hydraulic cylinders (or the like) and maintenance of the beam in a level (or constantly inclined) attitude during raising is obtained by keeping the supply of liquid to the hydraulic cylinder (or cylinders) at one end of the beam constant, while adjusting the rate of liquid supply to the cylinders at the other end of the beam, such adjustment being effected automatically by a control system including means for sensing small deviations of the beam from the required constant attitude, and operative responsively to such means to energise an electric motor and determine the direction of its rotation, which motor operates a valve controlling the rate of supply of hydraulic liquid from a pressure-source, such as a pump, to the hydraulic cylinder(s) in question.

An example of an apparatus to which the present invention is applicable is a "Pressure Quench Unit" for rapidly quenching from high temperature massive steel plates (which may be up to at least 45 ft. long). Such an apparatus typically comprises a fixed (horizontal) lower platen, a retractable conveyor system for moving the plate endwise into position over the lower platen and lowering it on to the platen and an upper platen (constituting the "beam" above referred to) which can be raised by a number of hydraulic cylinders at each end to admit the plate to be quenched and lowered (by gravity) on to the plate and thereafter subjected to downward pressure by other hydraulic means; both the upper and lower platens being armed with numerous spaced "feet" which grip the plate when the upper platen is lowered and between which both faces of the plate are exposed to copious jets of quenching water. In this apparatus, when the upper platen is lowered under gravity it levels itself, but when it is being raised by hydraulic power, it is essential that both ends are raised equally throughout the movement to keep the plate accurately level, since, on account more especially of its great length, even a very slight deviation from the level attitude would cause it to jam in its guides.

Another contemplated application of the invention is to "walking beam" furnaces, both of the "simple" and "balanced hearth" types in which maintenance of accurate horizontally (or constant inclination) and parallelism of the beams is an important requirement.

An object of the invention is a control system (for apparatus as first herein described) in which the means for sensing deviations of the beam from the required constant attitude comprises two voltage-varying devices, having a common input voltage, which are respectively associated with opposite ends of the beam, their movable, output voltage-adjusting elements being so mechanically actuated by the opposite ends of the beam that a deviation from the required beam attitude sets up a potential difference between the outputs of the said devices; and wherein such potential difference is applied to a balancing relay to close a normally open two-way switch on one or other of two contacts (according to the algebraic sign of said potential difference) which contacts respectively excite circuits operative to initiate rotation of the said motor in one direction or the other according to which of the said contacts is closed.

According to a further object of the invention, the voltage-varying devices are potentiometers, whose sliders are mechanically actuated by the opposite ends of the beam.

In one preferred form of construction, the potentiometers are of the rotary kind and their sliders are operatively connected to pinions in mesh with toothed racks respectively mounted on opposite ends of the beam.

For rotary potentiometers, linear potentiometers may be substituted, whose sliders are guided by vertical guides and actuated by vertical rods mounted on the ends of the beam.

Preferably also, the potentiometer circuits include additional series resistances, one of which may be adjustable to obtain initial balance of the voltages on the potentiometer sliders, the others being fixed. These series resistances serve to ensure that the voltage on either potentiometer slide cannot become (or approach) zero when the slide reaches (or approaches) one end of its travel, in which case the associated relay coil would carry insufficient current to provide adequate sensitivity of control.

In an alternative form of construction, the voltage-varying devices are variable transformers, whose movable voltage-adjusting elements may be movable cores.

How the foregoing objects, and such others as may hereinafter appear, may be achieved, will be better understood from the following description, having reference to the accompanying drawings, of an embodiment of the invention, given by the way of example only, and without limitation of the scope of the invention as defined in the hereto appended claims. In the drawings:

Figure 1:
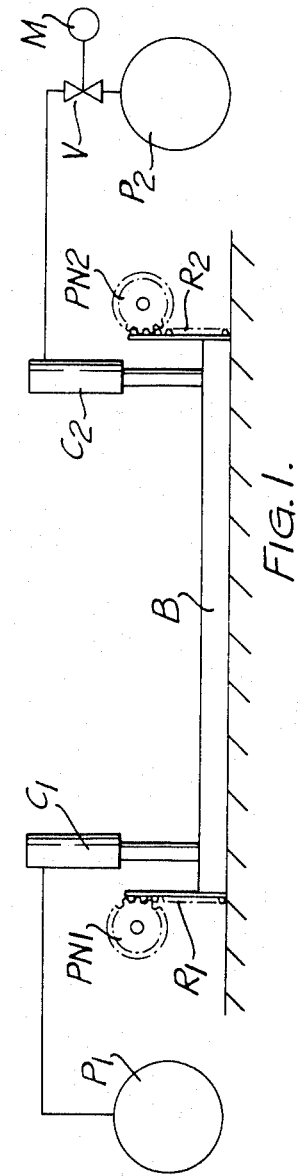
FIG. 1 is a schematic representation of the mechanical elements of the system.
Figure 3:
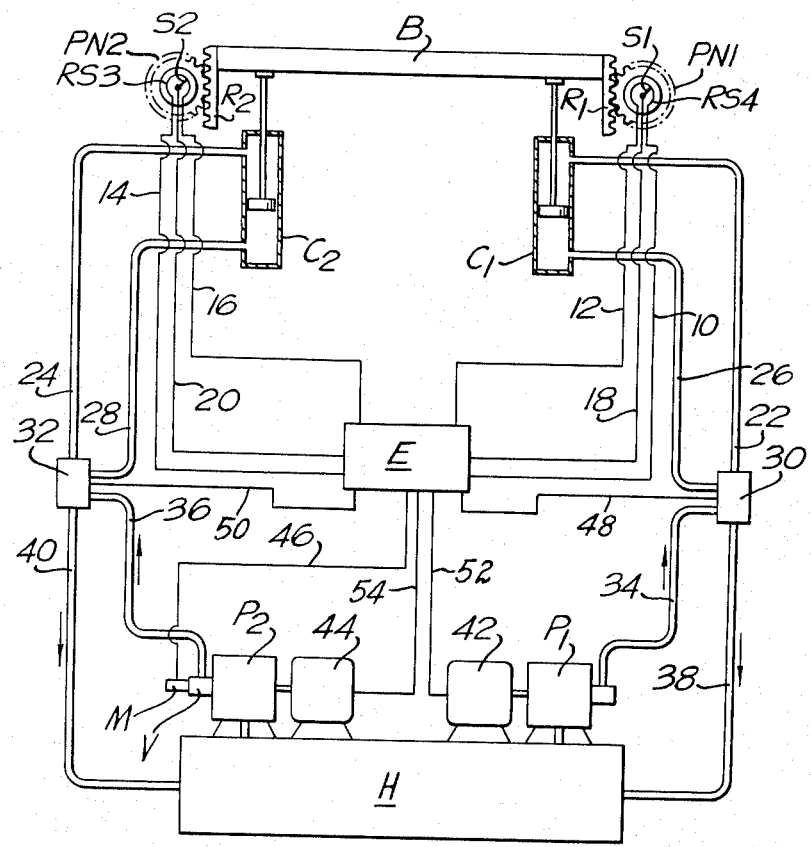
FIG. 3 is a schematic representation of mechanical hydraulic and some electrical details, in amplification of FIG. 1.

Referring to FIGS. 1 and 3, B is the beam to be raised and lowered in horizontal attitude, for which purpose it is provided with guides (not illustrated); $C_1$ and $C_2$ are hydraulic cylinders, whose pistons are respectively connected to opposite ends of the beam for raising it. Cylinder $C_1$ is fed by a pump $P_1$ having a constant delivery rate and cylinder $C_2$ by a pump $P_2$ whose delivery rate is controllable between predetermined limits by a valve V operated by a reversible motor M.

To each end of the beam B is fixed a vertical toothed rack. These racks $R_1$ and $R_2$ are respectively engaged with toothed pinions PN1 and PN2 on whose shafts, journalled in fixed bearings (not shown) are mounted rotary potentiometers whose windings (or slide wires) RS4, RS3 (see also FIG. 2) are connected by leads 10, 12 and 14, 16 with an electrical control panel E, and are swept by stationary wipers S1, S2, connected by leads 18, 20 with the electrical control panel E (see also FIG. 2).

The working spaces, above and below the pistons of cylinders $C_1$, $C_2$ are connected, by hydraulic lines 22, 26 and 24, 28 respectively, with reversing solenoid valves 30, 32, which in turn are connected to hydraulic leads 34, 38 and 36, 40 respectively. Leads 38, 40 are connected to a hydraulic tank H, lead 34 direct to pump $P_1$ and lead 36 to pump $P_2$ through valve V.

The valves 30, 32 are two position valves. In one position of valve 30 the hydraulic lines 22 and 34 are interconnected and line 26 is connected to line 38. In the other position of valve 30, line 22 is connected to line 38 and line 26 to line 34. Valve 32 operates similarly to interchange the connections of lines 24 and 28 with lines 36 and 40. The solenoids controlling the valves 30 and 32 are connected by leads (not shown) with a master switch hereinafter described (see FIG. 2). Pumps $P_1$, $P_2$ are driven by motors 42, 44 respectively, also connected by leads (not shown) with the master switch. The constructional details of valves 30, 32 and V are not illustrated, being of conventional type.

Figure 2:
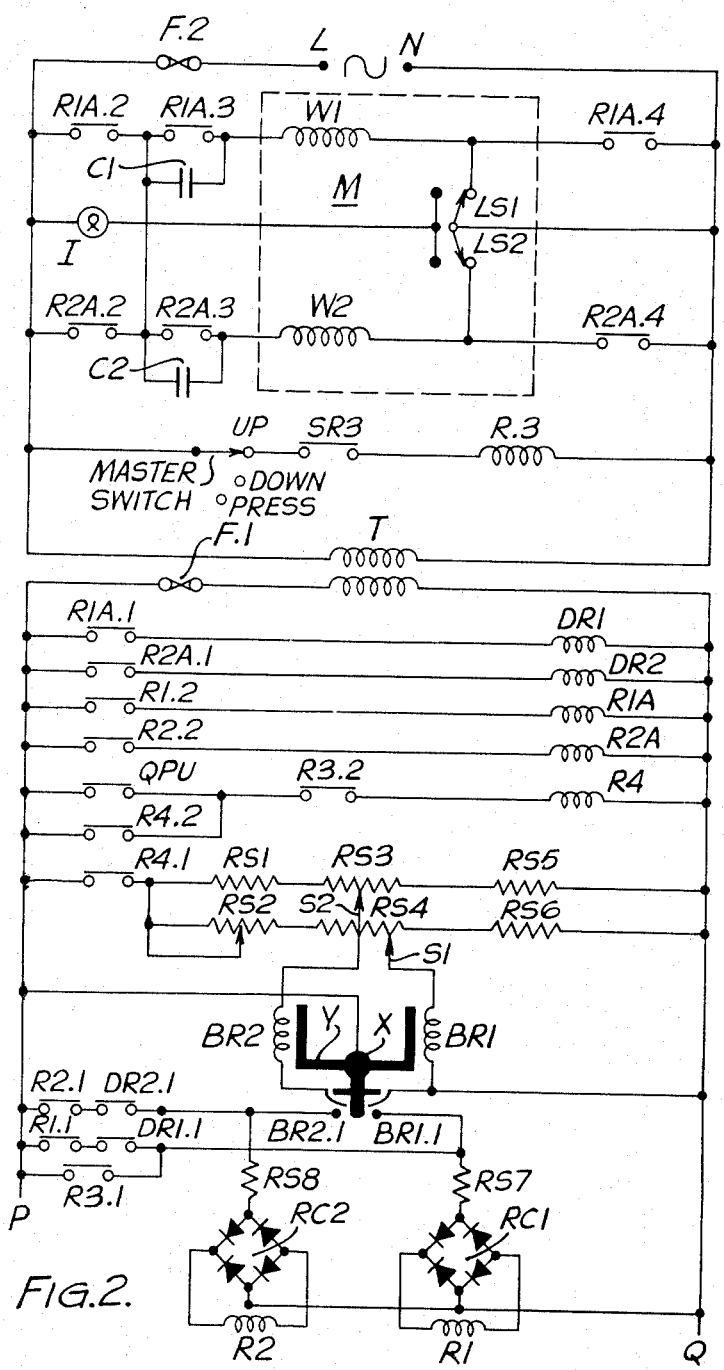
FIG. 2 is a circuit diagram.

A bundle of leads 46 connects the reversing motor M with the electrical control panel E on which are mounted switches, relays, resistances and other electrical items, whose connections are shown in FIG. 2.

Referring now to FIG. 2, the valve motor M, which is fed from a single-phase A.C. mains L, N, is of the type having two windings W1, W2, both of which must be excited to make the motor run, but the voltages on the respective windings must be 90° out of phase; and the direction of rotation depends on which of these voltages leads the other. This is accomplished by feeding one or other of the windings through a condenser which advances the phase of the supply voltage by 90°, as hereinafter more fully explained.

A step-down transformer T supplies sub-mains P, Q with single phase A.C. at a reduced voltage. The potentiometers RS3, RS4 are connected across these sub-mains, through a common switch R4.1, in series with resistances RS1, RS2 and RS5, RS6 respectively, of which resistance RS2 is manually adjustable for initial balancing purposes as already explained. The function of these four resistances (RS1, RS2, RS5, RS6) has already been explained.

The potentiometer sliders S1, S2 are respectively connected through balance relay coils BR1, BR2 to sub-main Q. Between these coils is pivotally mounted, at X, the armature Y, which as here shown has two limbs respectively adjacent the coils BR1 and BR2 and a central limb, connected to the sub-main P and constituting the movable contact of a two-way switch whose fixed contacts BR1.1 and BR2.1 are connected to sub-main Q through resistances and rectifying networks RS7, RC1 and RS8, RC2 respectively. Networks RC1 and RC2 supply direct current to relay coils R1 and R2 respectively. The networks RC1, RC2 are also connectible to the sub-main P through series switches R1.1, DR1.1 and R2.1 respectively. Simultaneous closure of switches R1.1 and DR1.1 short-circuits switch contact BR1 and similarly switch contact BR2 is short-circuitable by simultaneous closure of switches R2.1 and DR2.1. In addition, contact BR1 can also be short-circuited by closure of a switch R3.1. The purpose and operation of switches R3.1, R1.1, DR1.1, R2.1 and DR2.1 are hereinafter explained.

Connected across the sub-mains P, Q are relay coils DR1, DR2, R1A, R2A and R4 excitable respectively through switches R1A.1, R2A.1, R1.2, R2.2. DR1 and DR2 are delay relays the operation and purpose of which are hereinafter explained. The circuit R3.2, R4 is connected to sub-main P through parallel branches respectively containing a switch QPU and a switch R4.2.

A further relay coil R3 is connected across the mains L, N through a switch SR3 and the fixed contact, marked "UP" of a master switch having two other fixed contacts marked "DOWN" and "PRESS" respectively. The "UP" and "PRESS" contacts of the master switch are connected to the pump motors 42, 44 (FIG. 3) so that when the movable contact of the switch is on either of these fixed contacts, the pump motors are excited. These fixed contacts are also connected to the solenoids of valves 30 and 32' (FIG. 3) so that in the "UP" position the valves, 30 and 32 direct the deliveries of pumps $P_1$, $P_2$ (FIG. 3) to the lower working spaces of cylinders $C_1$, $C_2$ (FIG. 3) and connect the upper spaces of the cylinders to the tank H (FIG. 3). In the "DOWN" position of the master switch these connections are reversed and the pump motors 42, 44 are isolated. When the master switch is moved to the "PRESS" position the valves 30, 32 remain as in the "DOWN" position, but re-excitement of the pump motors causes hydraulic pressure to be supplied to the upper working spaces of cylinders $C_1$, $C_2$, thus exerting positive downward force on the beam B (FIG. 3). As hereinafter mentioned, these "other" circuits also control the switch SR3, apart from which they are not relevant to the present invention and hence are not herein described. The solenoid valve arrangement shown in FIGURE 3 (including valves 30 and 32, together with pumps $P_1$ and $P_2$ and the hydraulic lines 22, 24, 26, 28, 34, 36, 38 and 40 associated with the valves) is conventional. Further, the operation of this arrangement, as described above, is also conventional. Therefore, this solenoid valve structure, together with the means connected thereto may be looked upon as a typical environment in which the present invention may operate.

Electrical connections between the panel E (shown in FIGURE 3) and the valves 30, 32 in motors 42, 44 are respectively indicated by the lines 48, 50, 52, and 54, each line representing one or a bundle of electric leads.

Turning now to the circuits controlling the valve motor M, winding W1 is connected across the mains L, N through a switch R1A.2, a condenser C1, short-circuitable by a switch R1A.3, and a limit switch LS1. Winding W2 is similarly connected through switch R2A.2, condenser C2, short-circuitable by switch R2A.3, and limit switch LS2. The limit switches are short-circuitable by closure of switches R1A.4 and R2A.4 respectively. The limit switches are mechanically operated by the motor, and when either of them is opened a connection across the mains L, N is established through an indicator lamp I.

The various relay switches mentioned above and shown in FIG. 2 are identified by reference characters corresponding to those of the relay coils by which they are operated. Thus, relay coil R1 operates switches R1.1 and R1.2, relay coil R1A operates switches R1A.1, R1A.2, R1A.3 and R1A.4, relay coil R3 operates switches R3.1 and R3.2, relay coil R4 operates switches R4.1 and R4.2 and relay coil DR1 operates switch DR1.1; and similarly with the relay coils R2, R2A and DR2 and their respectively associated switches, R2.1, R2.2; R2A1, R2A.2, R2A.3, R2A.4 and DR2.

The mains L, N are protected by a fuse F.2 and the sub-mains P, Q by a fuse F.1.

The system operates as follows:

Starting from the condition in which the beam B (FIG. 3) has been lowered and the fixed contact "UP" of the master switch is open-circuited, the relay coil R4 is excited through the normally closed switch R3.2 and its own holding switch R4.2 and holds the normally closed switch R4.1 open. Consequently, the circuits of potentiometers RS3, RS4 are dead, the balancing relay coils BR1, BR2 are not excited, the armature Y is central and both fixed contacts BR1.1 and BR2.1 are open-circuited.

At this stage switches R1.1 and R2.1 are open, relay R.3 is not excited and switch R3.1 is open. Consequently, the relay coils R1, R2 are not excited and relay coils R1A and R2A are not excited and switches R1A.2, R1A.4, R2A.2 and R2A.4 are open while switches R1A.1, R1A.3, R2A.1 and R2A.3 are closed. Also switch SR.3 is closed and the switch QPU is open.

The closure of switches R1A.1 and R2A.2 causes the delay relay coils DR1 and RD2 to be excited to close the normally open switches DR1.1 and DR2.1. Furthermore, since switches R1A.2 and R2A.2 are open neither winding of the valve motor M is energised. It is also to be noted that one at least of the limit switches LS1, LS2 is closed.

On placing the movable contact of the master switch on the "UP" contact, the relay coil R3 is excited through switch SR3 to close switch R3.1 and open switch R3.2 thereby causing relay coil R1 to be excited (for a purpose hereinafter explained) and the relay coil R4 to be de-energised, allowing switch R4.2 to open and switch R4.1 to close thereby exciting the balancing relay coils BR1, BR2 through the potentiometer sliders S1, S2. At the same time, the circuit controlled from the "UP" contact are energised to start the pumps P1, P2 which feed the hydraulic cylinders C1, C2 for raising the beam B (FIG. 3). These circuits include an external relay system which introduces an appreciable delay before the beam B starts to rise. However, as soon as (or just before) the beam starts to rise, this external relay system opens the switch SR3 and de-energises the relay coil R3, thereby re-opening switch R3.1 and reclosing switch R3.2. However, re-closure of switch R3.2 does not re-excite the relay coil R4, since its holding switch R4.2 and the switch QPU are both open.

As soon as switch R3.1 opens, and since switches R1.1 and R2.1 are also open, the relay coils R1, R2 can only be excited by closure of the armature Y on one or other of the fixed contacts BR1.1 and BR2.1.

As the beam B rises, so long as it remains level the voltages on the potentiometer sliders S1, S2 will be equal and the currents carried by the balance relay coils BR1, BR2 will also be equal and the armature Y will remain in the neutral position with both fixed contacts BR1.1 and BR2.1 open-circuited. But should the beam get out of level, the potentiometer sliders will be unequally displaced so that the voltages on them are unequal and one of the coils BR1, BR2 will carry more current than the other and attract the armature to close the circuit through one of the fixed contacts BR1.1, BR2.1, say BR1.2, causing relay coil R2 to be excited, thus closing switches R2.1, R2.2. Closure of the latter excites relay coil R2A, which in turn closes switch R2A.2 to excite both windings of the valve motor. However, coil R2.A also opens switch R2A.3 putting condenser C2 in circuit with windings W2, while condenser C1 remains short-circuited through switch R1A.3. This causes the motor M to rotate in the appropriate direction for correcting the deviation of the beam B from the level attitude by opening more widely the valve V (FIG. 3). Furthermore, the relay coil R2A also closes switch R2A.4 to complete the circuit of winding W2 if the limit switch LS2 should be open as may be the case as the result of a previous excursion of the motor as hereinafter explained; and it is to be noted that both limit switches LS1, LS2 cannot be open at the same time.

When the beam B has regained the level attitude, the potentiometer voltages, and consequently the currents carried by the balance relay coils, are equalised, the armature Y returns to the neutral position and the fixed contact BR2 is open-circuited, thus de-energising relay coil R2, thereby causing switch R2A.2 to reopen and stop the motor M.

The function of the delay relays DR1, DR2 is to suppress chattering of the armature Y on the fixed contacts BR1.1, BR2.1. As soon as the circuit through contact BR1.1, say, is closed the excitation of relay coil R1, by closing switch R1.1, short-circuits contact BR1.1 and maintains its excitation. But at the same time excitation of relay coil R1A opens switch R1A.1 and de-energises the delay relay coil DR1, allowing switch DR1.1 to open after a short time interval, say half a second, sufficient to allow the moving contact of the armature to come firmly to rest on contact BR1.1.

The function of switches R1A.4, R2A.4 is to re-start the motor after it has reached the limit of its permissible travel in either direction and opened a limit switch (by mechanical means—not illustrated). Closure of switch R1A.2 causes the motor to rotate in one direction, say clockwise. When it has completed its permissible travel in this direction it opens limit switch LS2 to open the circuit of winding W2, thus stopping itself. To re-start the motor in the opposite direction, by closure of switch R2A.2 (switch R1A.2 having been re-opened) the circuit of winding W2 must be completed. This is effected by simultaneous closure of switch R2A.4 to short out the open limit switch LS2. As soon as the motor has started in the opposite (counterclockwise) direction, limit switch LS2 re-closes. On reaching the limit of travel in the counterclockwise direction, the motor opens limit switch LS1 and de-energises winding W1, switch R1A.4 being now open. Re-starting of the motor in the clockwise direction is then effected by closure of switches R1A.2 and R1A.4.

When the beam B (FIG. 3) reaches its uppermost position it closes switch QPU by mechanical means (not illustrated) to re-excite coil R4 to open switch R4.1 and isolate the potentiometer circuits; and at the same time coil R4 closes switch R4.2 to maintain its excitation when the beam descends and allows switch QPU to re-open. When the beam "bottoms" the master switch may be closed on the "PRESS" fixed contact, to apply downward pressure to the beam, after which nothing further happens until the master switch is again closed on the "UP" fixed contact to re-excite coil R3 and re-open switch R3.2.

The auxiliary circuit SR3, R3 is peculiar to the particular embodiment herein described and illustrated. In this embodiment, it is desirable to set the valve V (FIG. 3) to its minimum delivery position, before the beam B (FIG. 3) starts ti rise. The temporary excitation of relay coil R3, during the delay between the closure of the master switch on the "UP" contact and the beam's starting to rise, effects this by opening switch R3.2 to de-energise relay coil R4 and thereby open switch R4.1 to render the potentiometer circuits dead, and by closing switch R3.1 to energise relay coil R1 to close switch R1A.2, open switch R1A.3 and start the valve motor M in the direction for decreasing flow through the valve V. The motor will continue to run until it reaches its minimum limit position. This is accomplished within the delay period before the beam starts to rise; and as soon as relay coil R3 is de-energised by the opening of switch SR3 the normal operation of the system is resumed.

Figure 4:
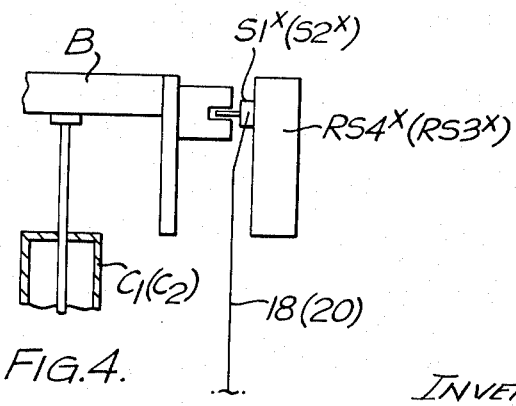
FIG. 4 schematically illustrates linear potentiometers which may be employed in the invention.

FIG. 4 illustrates a modification in which the rotary potentiometers RS3, RS4 (FIG. 3) are replaced by fixed (vertical) linear potentiometers $RS3^x$, $RS4^x$ whose sliders $S_2^x$, $S_1^x$ are attached to or engaged by the beam B so as to move with it.

It is to be understood that all such modifications, variations and substitution of elements may be made as are within the competence of those skilled in the art and within the spirit and scope of the invention as defined in the hereto appended claims.

I claim:

1. In combination, apparatus comprising a beam member which can be raised and lowered, hydraulic actuator means for raising one end of said beam member supplied with a variable flow of hydraulic pressure fluid, valve means for varying said flow and a reversible electric motor for operating said valve means, and other hydraulic actuator means supplied with a constant flow of hydraulic pressure fluid, for raising the opposite end of said beam member; an electrical control system for maintaining said beam member, during raising thereof, at a constant predetermined inclination to the horizontal (which may be zero), said system including two voltage varying devices with common input voltage and each having a movable output voltage-adjusting element, mechanical means so operatively connecting said elements respectively with one end and the other end of said beam member that deviation of the latter member from its predetermined inclination causes a potential difference between the outputs of said devices, a balancing relay having two coils to which said outputs are respectively applied, a normally open two-way switch so actuated by said balancing relay as to close on one or the other of two contacts when said output-potentials differ, according to whichever of them is the greater, and motor-controlling circuits connected to said contacts respectively for initiating rotation of said valve-operating motor in the forward or reverse direction according to which of the said two contacts is closed.

2. In combination, apparatus comprising a beam member which can be raised and lowered, hydraulic actuator means for raising one end of said beam member supplied with a variable flow of hydraulic pressure fluid, valve means for varying said flow and a reversible electric motor for operating said valve means, and other hydraulic actuator means supplied with a constant flow of hydraulic pressure fluid, for raising the opposite end of said beam member; an electrical control system for maintaining said beam member, during raising thereof, at a constant predetermined inclination to the horizontal (which may be zero), said system including two potentiometers which common input voltage and each having a movable output voltage-adjusting slider, mechanical means so operatively connecting said sliders respectively with one end and the other end of said beam member that deviation of the latter member from its predetermined inclination causes a potential difference between the outputs of said potentiometers, a balancing relay having two coils to which said outputs are respectively applied, a normally open two-way switch so actuated by said balancing relay as to close on one or the other of two contacts when said output-potentials differ, according to whichever of them is the greater, and motor-controlling circuits connected to said contacts respectively for initiating rotation of said valve-operating motor in the forward or reverse direction according to which of the said two contacts is closed.

3. The combination of claim 2, in which the potentiometers are of the rotary type and the mechanical means connecting their sliders with the opposed ends of said beam member comprise pinions on which the potentiometer sliders are mounted and toothed racks mounted on the said beam member and engaging said pinions.

4. The combination of claim 2, in which each potentiometer includes additional series resistances (to prevent its output voltage from approaching zero when its slider reaches either limit of its travel) and means for adjusting at least one of said additional resistances for initial balancing purposes.

5. The combination of claim 1, in which said balancing relay includes an armature attractable by whichever of said balancing relay coils carries the greater current, the movable contact of said two-way switch being rigidly connected to said armature.

6. In combination, apparatus comprising a beam member which can be raised and lowered, hydraulic actuator means for raising one end of said beam member supplied with a variable flow of hydraulic pressure fluid, valve means for varying said flow and a reversible electric motor for operating said valve means, and other hydraulic actuator means supplied with a constant flow of hydraulic pressure fluid, for raising the opposite end of said beam member; an electrical controlled system for maintaining said beam member, during raising thereof, at a constant predetermined inclination to the horizontal (which may be zero), said system including two voltage varying devices with common input voltage and each having a movable output voltage-adjusting element, mechanical means so operatively connecting said elements respectively with one end and the other end of said beam member that deviation of the latter member from its predetermined inclination causes a potential difference between the outputs of said devices, a balancing relay having two coils to which said outputs are respectively applied, a normally open two-way switch so actuated by said balancing relay as to close on one or the other of two contacts when said output-potentials differ, according to whichever of them is the greater, a normally open switch in the input of said voltage varying devices, a master relay operative when excited to close said last-named normally open switch, and thereby excite the balancing relay coils, a master switch in the circuit of said master relay, two relays respectively excitable through one and the other contact of said two-way switch, and motor-controlling switch means actuated by said last-named relays for initiating rotation of said valve-operating motor in the forward or reverse direction according to which of said last-named relays is excited.

7. In an apparatus for raising and lowering a beam member, said apparatus including actuator means for raising one end of said beam member supplied with a variable flow of hydraulic pressure fluid, valve means for varying said flow, a reversible electric motor for operating said valve means, and other hydraulic actuator means supplied with a constant flow of hydraulic pressure fluid for raising the opposite end of said beam member, the improvement of maintaining said beam member, during raising thereof, at a constant predetermined inclination to the horizontal, the improvement comprising an electrical control system including two voltage varying devices with common input voltage, each device having a movable output voltage-adjusting element; mechanical means so operatively connecting said elements respectively with one end and the other end of said beam member that deviation of the latter member from its predetermined inclination causes a potential difference between the outputs of said devices; a balancing relay having two coils to which said outputs are respectively applied; a normally open two-way switch so actuated by said balancing relay as to close on one or the other of two contacts when said output-potentials differ, according to whichever of them is the greater, and motor-controlling circuits connected to said contacts respectively for initiating rotation of said valve-operating motor in the forward or reverse direction according to which of the said two contacts is closed.

8. An apparatus as in claim 7, where said voltage varying devices are potentiometers.

9. Apparatus as in claim 8 where the said potentiometers are of the rotary type and the mechanical means connecting their sliders with the opposed ends of said beam member comprise pinions on which the potentiometer sliders are mounted and toothed racks mounted on the said beam member and engaging said pinions.

10. In apparatus as in claim 7 where the said motor controlling circuits include relay operated switches for short-circuiting said contacts and delaying-relay-operated switches for re-open-circuiting said contacts after a short interval of time to suppress chattering of said two-way switch on said contacts.

11. In apparatus as in claim 7 where said balancing relay includes an armature attractable by whichever of said relay coils carries the greatest current, the movable contact of said two-way switch being rigidly connected to said armature.

12. In combination, apparatus comprising a beam member which can be raised and lowered, hydraulic actuator means for raising one end of said beam member supplied with a variable flow of hydraulic pressure fluid valve means for varying said flow and a reversible electric motor for operating said valve means, and other hydraulic acuator means supplied with a constant flow of hydraulic pressure fluid, for raising the opposite end of said beam member; an electrical control system for maintaining said beam member, during raising thereof, at a constant predetermined inclination to the horizontal (which may be zero), said system including two voltage varying devices with common input voltage and each having a movable output voltage-adjusting element, mechanical means so operatively connecting said elements respectively with one end and the other end of said beam member that deviation of the latter member from its predetermined inclination causes a potential difference between the outputs of said devices, a balancing relay having two coils to which said outputs are respectively applied, a normally open two-way switch so actuated by said balancing relay as to close on one or the other of two contacts when said output-potentials differ, according to whichever of them is the greater, and motor-controlling circuits connected to said contacts respectively for initiating rotation of said valve-operating motor in the forward or reverse direction according to which of the said two contacts is closed, said circuits connected to the contacts of said two-way switch include relay operated switches for short-circuiting said contacts (to maintain excitation of said motor on closure of either of said contacts) and delaying-relay-operated switches for re-open-circuiting said contacts after a short interval, e.g. half a second, whereby to suppress chattering of said two-way switch on said contacts.

References Cited by the Examiner

UNITED STATES PATENTS 2,958,199    3/1959    Anderson et al.    91—171
3,039,513    6/1962    Lasiewiez et al.    91—171

FOREIGN PATENTS 498,934    12/1953    Canada.
615,475    2/1961    Canada.

SAMUEL LEVINE, *Primary Examiner.*

P. E. MASLOUSKY, *Assistant Examiner.*